United States Patent [19]
Funayama et al.

[11] Patent Number: 5,161,080
[45] Date of Patent: Nov. 3, 1992

[54] REDUCED FRICTION DISC CARTRIDGE SHUTTER SIRFACES

[75] Inventors: Masanori Funayama; Shuichi Kikuchi, both of Miyagi, Japan

[73] Assignee: Sony Corporation, Tokyo, Japan

[21] Appl. No.: 605,936

[22] Filed: Oct. 30, 1990

[30] Foreign Application Priority Data

Nov. 2, 1989 [JP] Japan ............................ 1-128797[U]

[51] Int. Cl.⁵ ............................................. G11B 23/03
[52] U.S. Cl. .................................................. 360/133
[58] Field of Search ......................... 360/133; 369/291

[56] References Cited

U.S. PATENT DOCUMENTS 4,698,714 10/1987 Sugawara et al. .................. 360/133
4,714,973 12/1987 Kato et al. .......................... 360/133

Primary Examiner—Robert S. Tupper
Attorney, Agent, or Firm—Philip M. Shaw, Jr.

[57] ABSTRACT

Projections and recesses or the like are formed or an adhesive is coated on slide contact surfaces of a main cartridge body rotatably accommodating a disk such as a magnetic disk or an optical disk and a shutter mounted movably on the main cartridge body for opening or closing an opening formed in the main cartridge body for exposing a portion of the disk to outside to provide the slide contact surfaces with low friction to prevent wear of the shutter and/or the main cartridge body.

14 Claims, 6 Drawing Sheets

REDUCED FRICTION DISC CARTRIDGE SHUTTER SIRFACES

BACKGROUND OF THE INVENTION

1. Field of the Invention

This invention relates to a disk cartridge rotatably accommodating therein a disk such as a magnetic disk or an optical disk. More particularly, it relates to a disk cartridge in which, for preventing the wear otherwise caused to the slide contact surfaces of a shutter mounted on the main cartridge body, surface irregularities are formed on or a lubricant is applied to these surfaces.

2. Description of the Prior Art

Up to now, as a recording medium for recording information signals, such as data signals, a magnetic disk comprised of a base member in the form of a disk-shaped thin film sheet and a magnetic layer deposited thereon as signal recording layer has been used extensively. This type of magnetic disk, however, may be damaged easily during handling since the brittle thin film is used as the base member. In addition, the slightest injury to the magnetic layer results in loss of data because of the elevated recording density of the magnetic disk.

For this reason, this type of the magnetic disk is accommodated in a main cartridge body and loaded in this state into the recording/reproducing apparatus.

The disk cartridge is provided with an opening for exposing the signal recording surface of the magnetic disk accommodated in the main cartridge body to the outside along the disk radius. The magnetic head of the recording and/or reproducing apparatus is intruded into the main cartridge body by way of the opening so as to be slidingly contacted with the magnetic disk.

Meanwhile, should the head inserting opening remain open, dust and dirt may be intruded by way of the opening into the main cartridge body to contaminate the signal recording surface of the magnetic disk. In addition, the magnetic disk may be touched during its handling by the hand or finger to contaminate similarly the signal recording surface of the magnetic disk.

For this reason, a shutter is usually provided with this type of disk cartridge for exposing the opening in the main cartridge body only when necessary, such as for recording information onto, or reading information from, the magnetic disk. This shutter is a thin plate of metal, such as stainless steel, bent into a U-shaped cross-section. The shutter is slidably mounted on the main cartridge body so as to have a slidable fit over the two major surfaces of the main cartridge body. The shutter has a window substantially coextensive with the opening in the main cartridge body and may be moved until the window is coincident with the opening.

For positively closing the opening, the shutter is formed to have a close sliding fit over the major surfaces of the main cartridge body when mounted on the main cartridge body.

It is noted that, if the shutter is formed to have a close sliding fit over the major sides of the main cartridge body, the area of relative slide contact of the shutter and the main cartridge body is increased, such that the friction of slide contact at the time of the sliding movement of the shutter is significantly increased to interfere with smooth sliding movement of the shutter.

On the other hand, the shutter formed by a metal plate, such as a stainless steel plate, is of a hardness markedly higher than that of the main cartridge body, which is molded from a resin material. Therefore, when the shutter slides synthetic resin material scrapes off the cartridge body. Besides for preventing accidental extraction of the shutter from the main cartridge body and guiding the sliding movement of the shutter, the shutter is formed with a pawl engaging in a mating groove in the main cartridge body. Since this pawl is formed by partially cutting and bending the thin metal plate, it has a sharper end face. Thus the sliding contact of the end face with the mating groove in the main cartridge body results in an increased scraping of the main cartridge body material. If such scraping occurs, the resulting chips tend to be intruded into the main cartridge body and affixed on the signal recording surface of the disk, which can cause errors during recording and reproduction of information signals.

To overcome the problem proper to the metallic shutter, it is proposed that a shutter be formed by a molded member of synthetic resin, similarly to the main cartridge body. A disk cartridge having the shutter formed of synthetic resin is disclosed, for example, in U.S. Pat. No. 4,698,714 (the '714 patent).

However, even if the shutter is formed of synthetic resin, as taught in the '714 Patent, should the shutter have a tight sliding fit over the major surfaces of the main cartridge body to provide for positive closure of the main cartridge body, the area of relative slide contact between the shutter and the main cartridge body is increased, such that the friction of sliding contact at the time of the sliding movement of the shutter is increased to interfere with smooth sliding of the shutter. Since the friction of sliding contact between the shutter and the main cartridge body is increased, scraping off of the materials of the main cartridge body and the shutter occurs after repeated usage similarly to the metallic shutter, such that the scraping chips would be introduced inevitably into the main cartridge body.

OBJECT AND SUMMARY OF THE INVENTION

It is therefore an object of the present invention to provide a disk cartridge wherein the friction of sliding contact at the time of the sliding movement of the shutter mounted on the main cartridge body may be reduced to assure smooth sliding of the shutter to prevent scraping off of the materials of the main cartridge body or the shutter which might otherwise occur as a result of the sliding movement of the shutter.

According to the present invention, there is provided a disk cartridge with a shutter, the shutter being movably mounted on a main cartridge body, and the main cartridge body rotatably accommodating therein a disk such as an optical disk or a magnetic disk. The shutter uncover and cover an opening in the main cartridge body for partially exposing the disk. One or both of the surfaces of the shutter and the main cartridge body in relative sliding contact with each other is formed as a low friction surface or surfaces by forming surface irregularities on, or applying a lubricant to, such one or both of these surfaces.

With the above described disk cartridge, the friction of sliding contact at the time of the sliding of the shutter relative to the main cartridge may be reduced since the slide contact surfaces of the shutter and the main cartridge body are designed as low friction surfaces.

DETAILED DESCRIPTION OF PREFERRED EMBODIMENTS

In an embodiment which will be explained hereinafter, the present invention is applied to a disk cartridge 1 in which a magnetic disk, that is, a disk-shaped thin film sheet as a base sheet and a magnetic layer applied as a signal recording layer on the surface of the base sheet, is accommodated in a disk cartridge.

Figure 1:
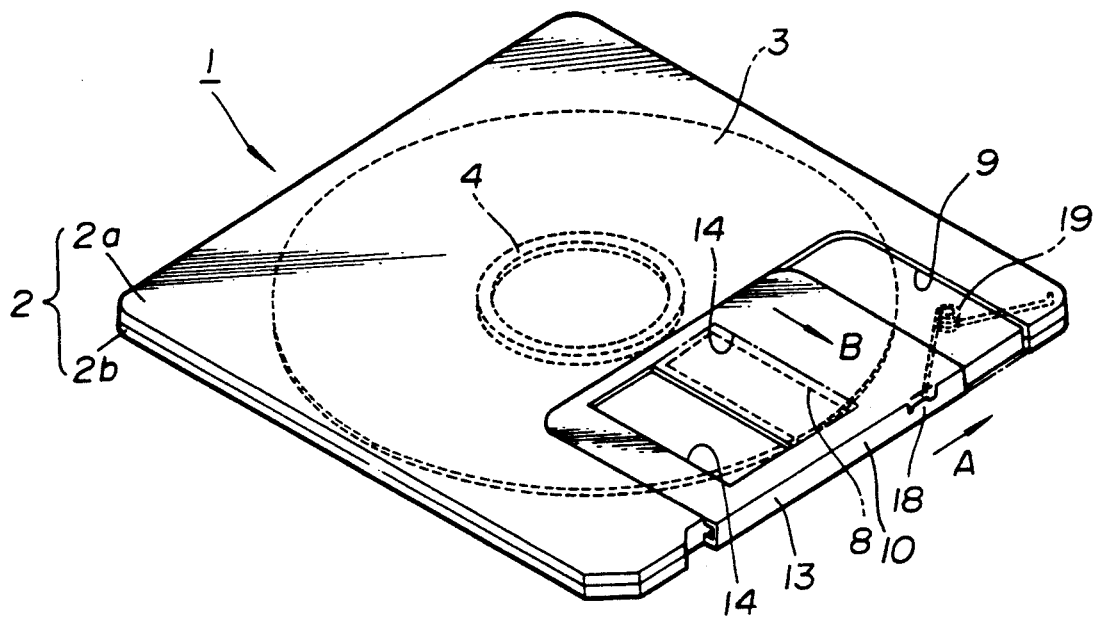
FIG. 1 is a perspective view showing the upper surface of a disk cartridge according to the present invention.
Figure 2:
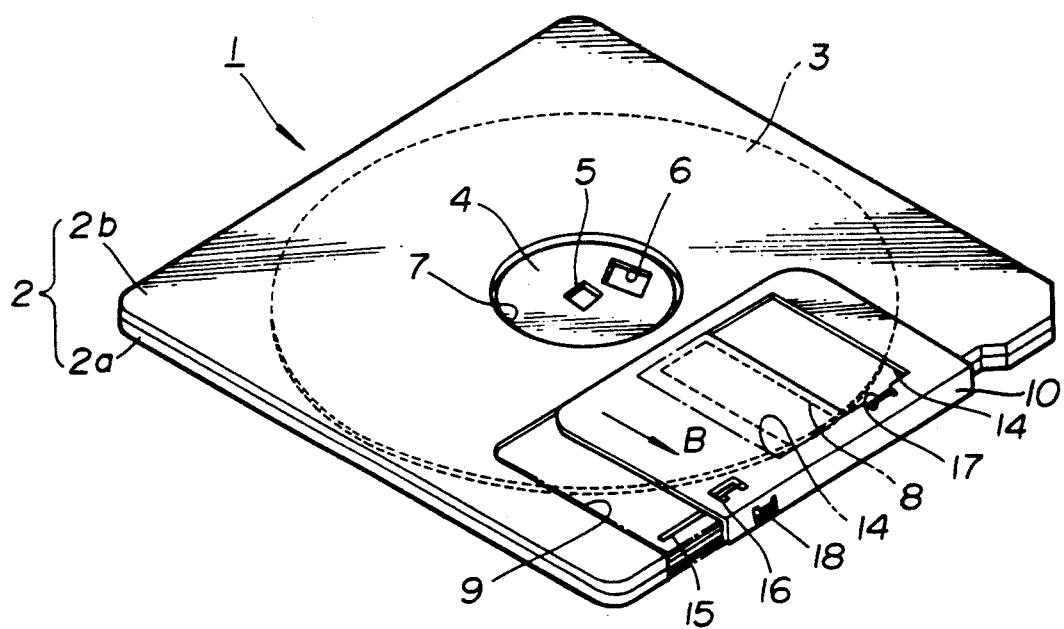
FIG. 2 is a perspective view showing the lower surface of a disk cartridge.

Referring to FIGS. 1 and 2, a disk cartridge 1 embodying the present invention is constituted by a main cartridge body 2, formed by upper and lower halves 2a, 2b in the form of flat rectangular plates abutted and connected to each other, and a magnetic disk 3 in the form of a disk-shaped sheet rotatably accommodated within the main cartridge body 2. A central disk-shaped member 4 formed by a metal plate and operating as a mounting means, or a disk table of a disk driving device of a magnetic recording and/or reproducing apparatus into which the disk cartridge is loaded, is provided at the center of the magnetic disk 3 accommodated in the main cartridge body 2. Referring to FIG. 2, the central disk-shaped member 4 has a central opening 5 engaged by the central driving shaft of a disk table (not shown), and a rectangular opening 6, at a position offset from the center of the member 4, engaged by the driving pin of the disk table (not shown). When the disk 3 is received within the main cartridge body 2, the disk-shaped member 4 is loosely fitted in a disk table inserting aperture 7 formed at the center of the lower half 2b of the main cartridge body 2.

The upper and lower halves of the main cartridge body 2 are molded from synthetic resin, such as ABS resin, in which an antistatic agent is incorporated. If necessary, a line of a non-woven fabric for preventing wear or deposition of static charges or peeling off of magnetic powders applied to the magnetic disk 3 may be formed, such as by heat or ultrasonic fusion, on each of the inner surfaces of the upper and lower halves 2a, 2b. The cartridge halves 2a, 2b are unified to each other by ultrasonic fusion along the opposing peripheral edges thereof abutted to each other to form the main cartridge body 2 accommodating the magnetic disk 3. The main cartridge body 2 is formed with head inserting apertures 8, 8 to permit the entry of the magnetic head provided at the magnetic recording/reproducing apparatus and also to permit the signal recording surface of the magnetic disk 3 to be exposed to the outside along the radius of the disk. These apertures 8, 8 are substantially rectangular and are extended from the vicinity of the disk table inserting aperture 7 at the center in the transverse direction of the main cartridge body 2 towards the front side of the main cartridge body 2.

Figure 3:
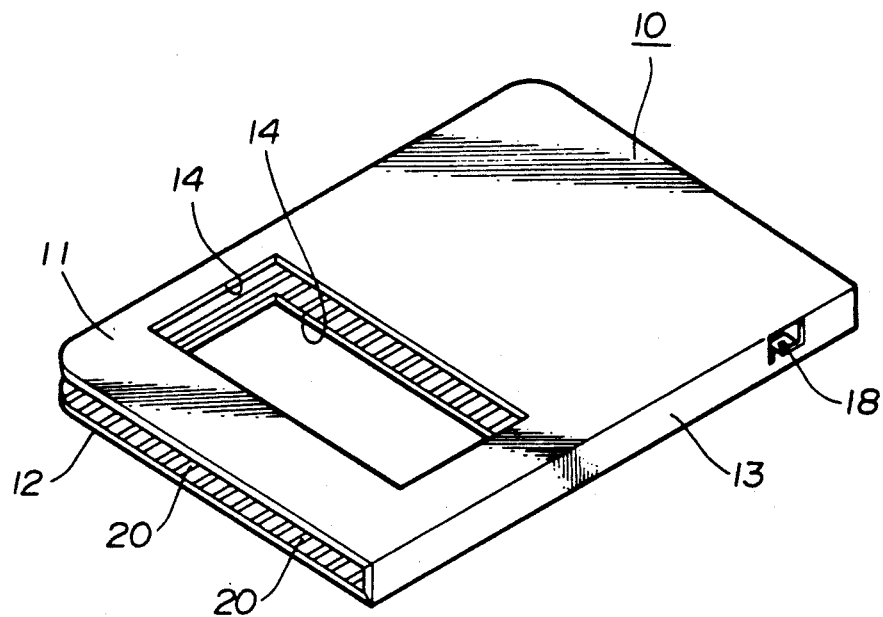
FIG. 3 is a perspective view showing a shutter applied to a disk cartridge.

Shutter slide sections 9, 9 are formed as recesses on those portions of the outer surfaces of the main cartridge body 2 encompassing the apertures 8, 8. A shutter 10 having the cross-sectional shape of a letter U as shown in FIG. 3 is fitted over these shutter slide sections 9, 9 from the front of the main cartridge body 2. The shutter 10 may slide within the extent of the shutter slide sections 9, 9 to open or close the apertures 8, 8.

Figure 4:
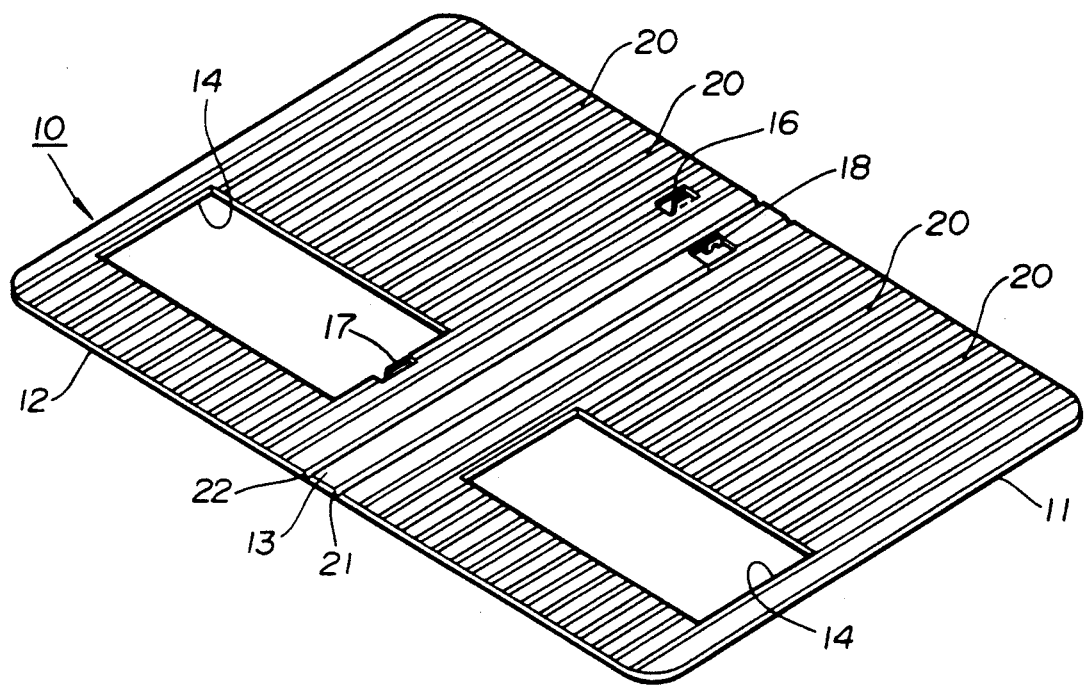
FIG. 4 is a perspective view showing the inner surface of a shutter in the developed state.

The shutter 10 may be formed from synthetic resin, such as polyacetal, polypropylene or vinyl chloride and, as shown in FIG. 3, and is constituted by first and second cover plates 11, 12 for covering the openings 8, 8 of the main cartridge body 2 and a web or side plate 13 interconnecting the cover plates 11, 12 at the proximal side. Towards one side of each of the first and second cover plates 11, 12 are formed windows 14, 14 substantially coextensive with the apertures 8, 8. As shown in FIG. 4, on the inner lateral sides of one cover plate 12 towards the side plate 13, a pair of engaging pieces 16, 17 engaging in a slide guide groove 15 (FIG. 2) formed in the lower half 2b of the main cartridge body 2. The above described shutter 10 is fitted to the front side of the main cartridge body 2, as shown in FIGS. 1 and 2, with the first and second cover plates 11, 12 extending along the slide guide sections 9, 9. The shutter 10 is slidably mounted on the main cartridge body 2 with the engaging pieces 16, 17 engaging in and slidable along the slide guide groove 15.

The shutter mounted in this manner on the main cartridge body 2 is biased to and maintained at a position shown in FIGS. 1 and 2 in which the windows 14, 14 formed in the first and second cover plates 11, 12 are not in register with the openings 8, 8 in the main cartridge body 12. This bias is accomplished by having one end of a torsion coil spring 19 in the main cartridge body 2 retained by a spring retainer 18 on the inner lateral surface of the side plate 13. When the disk cartridge 1 is loaded on the magnetic recording and/or reproducing apparatus and the shutter 10 is slid against the bias of the torsion coil spring 19, in the direction shown by an arrow A in FIG. 1 the windows 14, 14 in the first and second cover plates 11, 12 are coincident with the openings 8, 8 in the main cartridge body 2, as shown by a chain dotted line in FIGS. 1 and 2, such that the signal recording surface of the magnetic disk 3 accommodated in the main cartridge body 3 is exposed to outside along the disk radius.

On the inner sides of the first and second cover plates 11, 12 of the shutter 10 in sliding contact with the shutter slide sections of the main cartridge body 2, there are formed a large number of ribs 20, as shown in FIG. 4, which serve as bearing surfaces between the shutter 10 and the cartridge body 2. These ribs 20 are formed parallel to one another along the slide direction of the shutter 10. In case of the shutter 10 employed in the disk cartridge 1 accommodating the magnetic disk 3 which is 3.5 inches in diameter, the ribs 20 are about 0.05 mm in height and about 0.1 mm in width, and are at a pitch of about 2 to 3 mm over the entire width of the cover plates 11, 12. By provision of these ribs 20, the area of sliding contact between the shutter and the shutter slide sections 9, 9 may be reduced, so that the surfaces of the cover plates 11, 12 slid against the shutter slide sections 9, 9 with low friction.

The shutter 10 provided with ribs 10 extending parallel to the slide direction is difficult to extract from the main cartridge body 2, since the ribs inhibit extraction.

To fabricate the above described shutter 10, a synthetic resin material, such as polyacetal, polypropylene or vinyl propylene sheets, are prepared is sheet formed. These materials are heat-treated, such as by annealing, thus relieving inner stresses to provide a homogenous resin sheet. One lateral surface of the sheet is formed with parallel ribs 20 such as by extrusion with the use of a metal mold.

The resin sheet is then cut to the same size as the shutter 10 as shown in FIG. 4. The openings 14, 14 are formed in the sheet, and at the same time the engaging pieces 16, 17 and the spring retainer 18 are formed. In the connecting portions between the first and second cover plates 11, 12 and the side plate 13, there are formed vee grooves 21, 22, as shown in FIG. 4.

Figure 5:
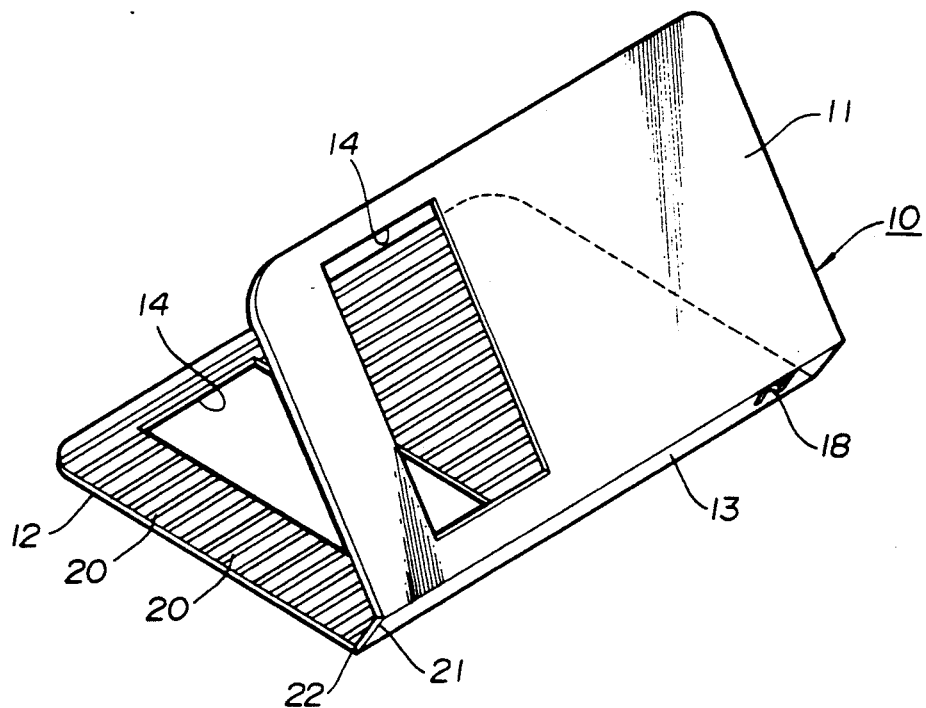
FIG. 5 is a perspective view showing the bending step in the course of the process of fabrication of a shutter.

The shutter 10, thus fabricated as shown in FIG. 4, is bent along vee grooves 21, 22, as shown in FIG. 5, into the shape of the shutter shown in FIG. 3. At this time, a bonding agent such as a resin agent cured by UV rays, is filled in the bent vee grooves 21, 22, for permanently maintaining the bent state of the first and second cover plates 11, 12 with respect to the side plate 13.

Figure 6:
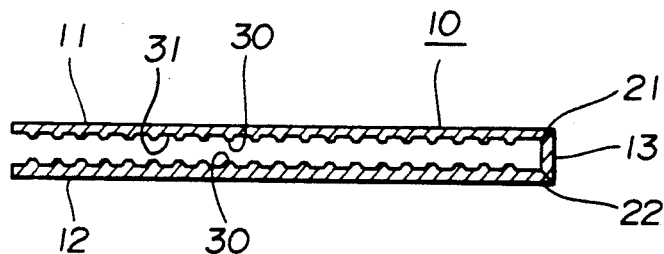
FIG. 6 is a cross-sectional view showing a shutter which is used with the disk cartridge of the present invention and which is provided with surface irregularities.

It will be noted that other measures than the ribs 20 may be used to provide the surfaces kept in sliding contact with the shutter slide sections 9, 9 of the first and second cover plates 11, 12 of the shutter 10 with the properties of low friction. For example, the surfaces of the first and second cover plates 11, 12 in sliding contact with the shutter slide sections 9, 9 of the first and second cover plates 11, 12 may be embossed to form a large number of minor projections 30 and recesses 31 on the overall surface of the plates 11, 12 as shown in FIG. 6.

A surface of the shutter 10 formed with these minor projections 30 and recesses 31, may like a surface with ribs, have a reduced slide contact area with the shutter slide sections 9, 9 so that the surfaces of the first and second cover plates 11, 12 may prove to be surfaces of reduced friction.

Figure 7:
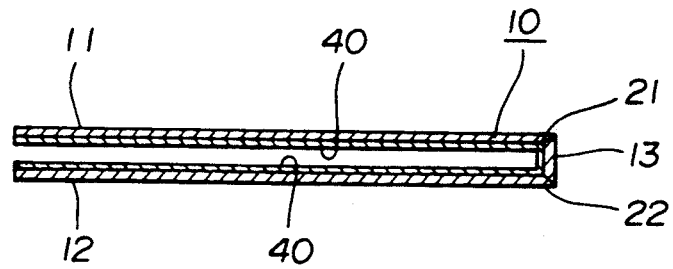
FIG. 7 is a cross-sectional view showing a shutter coated with a lubricant.

The measures to be taken for reducing the friction of the surfaces of the first and second cover plates 11, 12 in slide contact with the shutter slide sections 9, 9 are not limited to reducing the contact area between the surfaces such as with ribs 20 or projections 30 and recesses 31. For example, the overall inner surfaces of the first and second cover plates 11, 12 in sliding contact with the shutter slide sections 9, 9 may be coated with a solid lubricant 40 as shown in FIG. 7. The lubricant 40 may be a mixture of a synthetic resin agent such as an oligomer resin of a low molecular weight and a silicone type agent exhibiting lubricating properties. The lubricant 40 is coated on one lateral side of a sheet-like synthetic resin material or a material punched to form the shutter 10 and subsequently cured in situ such as by irradiation by UV rays.

When the lubricant is coated in this manner on the first and second cover sheets 11, 12, these sheets are deformed spontaneously slightly towards the side coated with the lubricant 40. The result is that, if the shutter 10 is fittingly mounted on the main cartridge body 2, the shutter can be held stably with a predetermined holding force with respect to the main cartridge body 2.

The lubricant 40 may additionally be applied to the surface formed with the ribs 20 or the surface irregularities 30. By applying the lubricant 40 on the inner surfaces of the cover plates 11, 12 provided in advance with the ribs 20 or surface irregularities 30, the surface of the first and second cover plates 11, 12 in sliding contact with the shutter slide sections 9, 9 can be additionally lowered in frictional properties.

Figure 8:
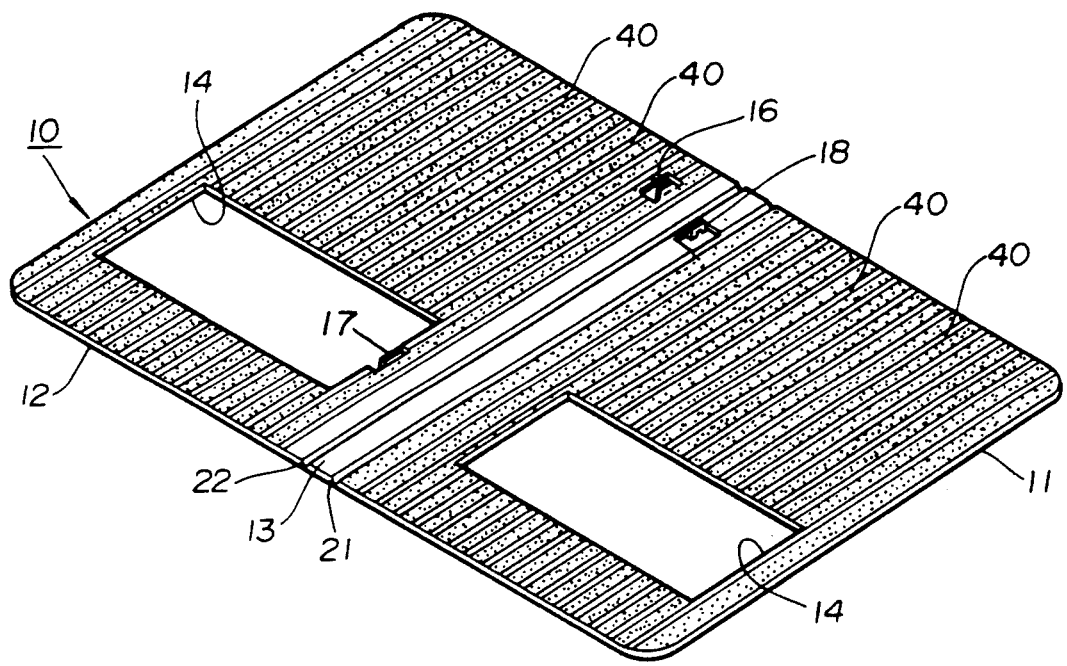
FIG. 8 is a perspective view showing the inner surface of a shutter in the developed state coated with lubricant in stripe form.

It will be noted that, when the lubricant 40 is applied to the overall inner surfaces of the shutter 10 in sliding contact with the shutter slide surfaces of the shutter slide sections 9, 9, the shutter 10 will become slippery not only in the slide direction of opening or closing the openings 8, 8 of the main cartridge body 2 but in the direction normal thereto as shown by an arrow B in FIG. 1. Thus, if disk cartridge is dropped accidentally, the shutter 10 tends to fall off from the main cartridge body 2. It is therefore desirable that the lubricant 40 be applied in stripes each having a predetermined width in the slide direction of the shutter 10, as shown in FIG. 8. When the lubricant 40 is applied in stripe form in this manner, the friction of slide contact in the direction in which the shutter 10 falls off from the main cartridge body 2 becomes large enough as compared to that in the slide direction to prevent such accidental detachment of the shutter.

It will be noted that the lubricant 40 may be applied to a thickness of 5 to 15 μm in the form of a thin plate of synthetic resin without deforming the shutter 10 and while achieving the sufficient lowering of the friction of slide contact.

In addition, the ribs 20 or the surface irregularities 30 may be formed on, or lubricant 40 may be applied to the inner surface of the side plate 13 in addition to the first and second cover plates 11, 12.

Although in the above embodiments, ribs 20 or surface irregularities 30 or have been formed on, lubricant 40 has been applied to the shutter 10 only, these measures may also be taken for the shutter slide sections 9, 9 of the main cartridge body 2.

Figure 9:
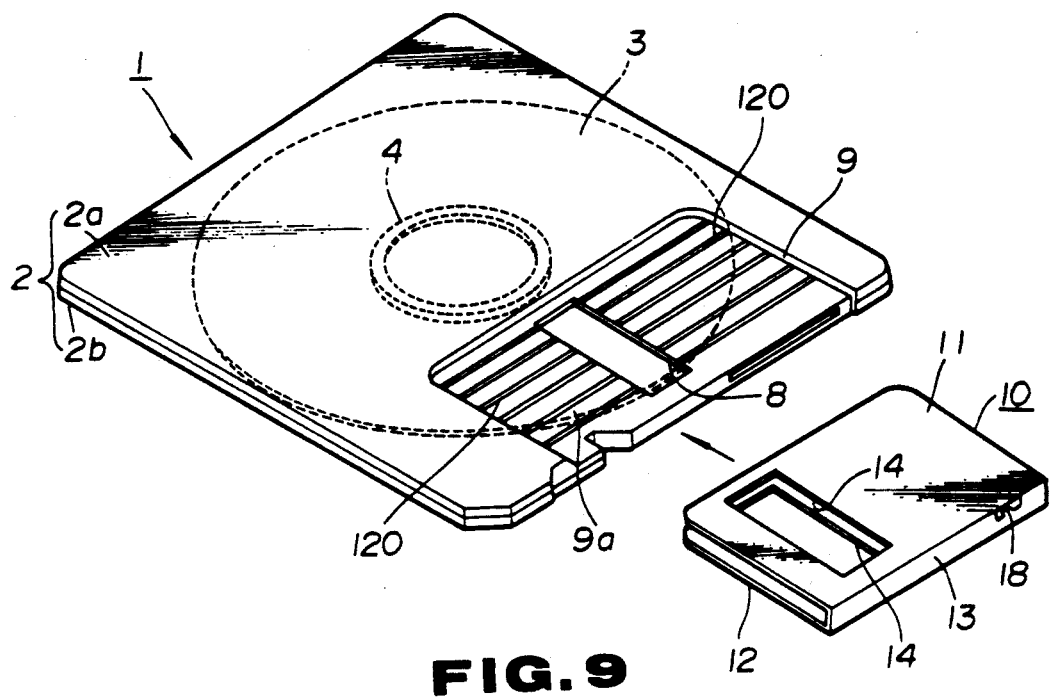
FIG. 9 is a perspective view showing the upper surface of a disk cartridge provided with ribs on the shutter slide section of the main cartridge body.
Figure 10:
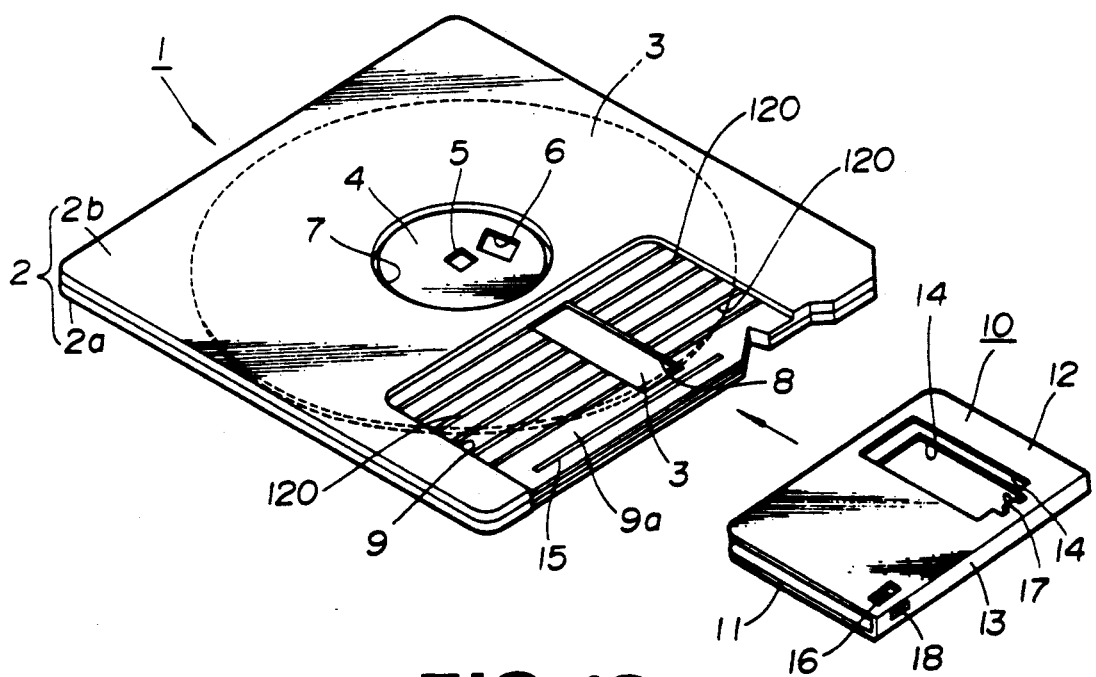
FIG. 10 is a perspective view showing the lower surface of a disk cartridge.

Thus, as shown in FIGS. 9 and 10, ribs 120 are formed on slide contact surfaces 9a, 9b of the shutter slide sections 9, 9 on the upper and lower surfaces of the main cartridge body 2. These ribs 120 are formed parallel to one another in the slide direction of the shutter 10, similarly to those formed on the shutter 10 in FIG. 4. In the case of a disk cartridge 1 accommodating a magnetic disk 3 which is 3.5 inches in diameter, the ribs 120 are about 0.05 mm in height and about 0.1 mm in width, parallel to one another, and with a pitch of about 2 to 3 mm over the entire area of the slide contact surfaces 9a, 9b. By provision of these ribs 120, the slide contact area with the cover plates 11, 12 of the shutter 10 may be reduced to provide the slide contact surfaces 9a, 9b for the shutter 10 with the properties of low friction.

Figure 11:
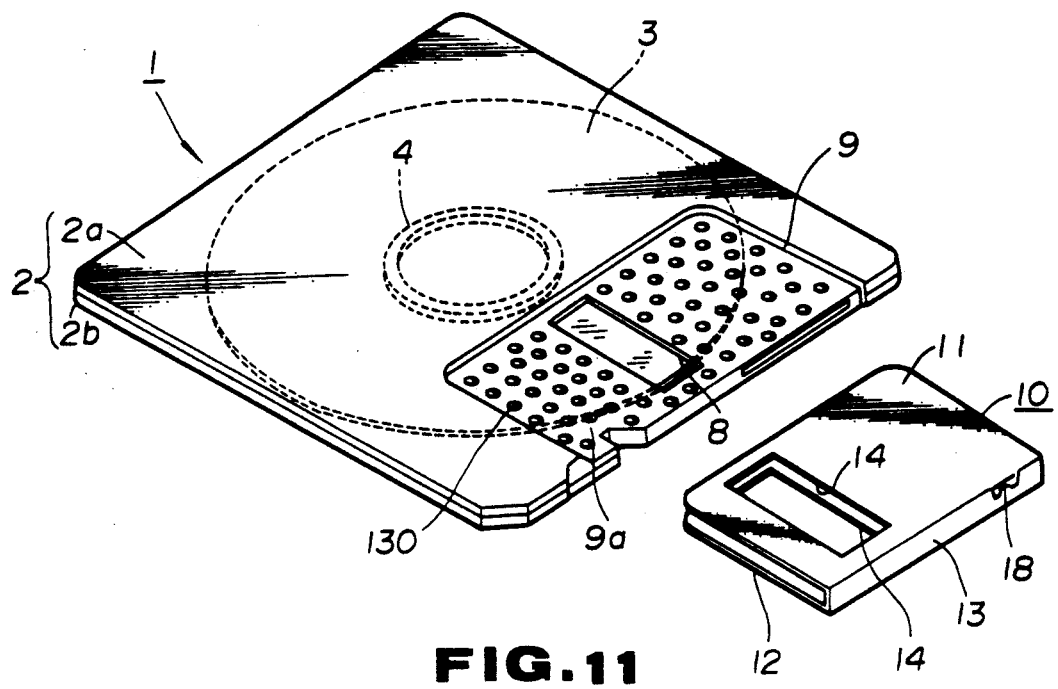
FIG. 11 is a perspective view showing the upper surface of a disk cartridge provided with surface irregularities on the shutter slide section of the main cartridge body.

The measures that can be taken to provide the slide contact surfaces 9a, 9b with low friction are not limited to ribs 120. For example, as shown in FIGS. 10 and 11, a large number of minor projections 130 and recesses 131 similar to those formed on the shutter 10 of FIG. 6 may also be formed on the entire area of the slide contact surfaces 9a, 9b.

Figure 12:
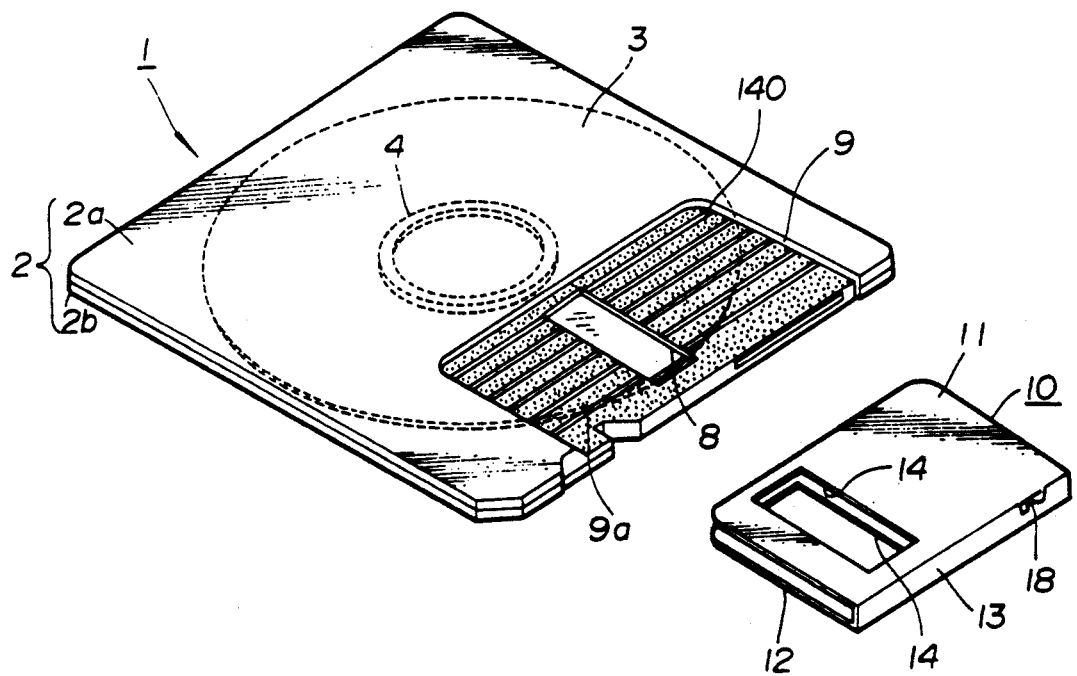
FIG. 12 is a perspective view showing the upper surface of a disk cartridge provided with lubricant in stripe form on the shutter slide section of the main cartridge body.

In addition, as shown in FIG. 12, the slide contact surfaces 9a and 9b may be coated with a lubricant 140 similar to that applied to the slide contact surfaces 9a and 9b of FIG. 7. It is preferred in this case that the lubricant 140 be applied in stripe form, as shown in FIG. 12, with the slide direction of the shutter 10 as the longitudinal direction, as in the case of applying the lubricant on the shutter 10, to prevent the shutter 10 from easily falling off the main cartridge body 2.

Lubricant 140 may also be applied on the ribs 120 or surface irregularities 131, as in the case of applying the lubricant to the shutter 10. The friction of the slide contact surfaces 9a, 9b on which the first and second cover plates 11, 12 of the shutter 10 slide may be further reduced by the application of the lubricant 40 in addition to the provision of the ribs 120 and the surface irregularities 130.

In the above embodiments, the measures of forming the ribs 20, 120 or surface irregularities 30, 130 are taken on the shutter 10 or on the slide contact surfaces 9a, 9b of the main cartridge body 2 on which slides the shutter 10. However, these measures may also be taken on both the shutter 10 and the main cartridge body 2 simultaneously. By providing both the slide contact surfaces of the shutter 10 and the main cartridge body 2 with low friction, the shutter 10 may be slid with a smoother motion.

Although the foregoing description has been made of the disk cartridge 1 accommodating the magnetic disk 3 therein, the present invention may be extensively applied to a disk cartridge accommodating a disk other than a magnetic disk, such as an optical disk, and provided with a shutter for opening or closing an opening provided in the main cartridge body.

What is claimed is:

1. A disk cartridge rotatably accommodating a disk therein, comprising
   a main cartridge body consisting of an upper half and a lower half,
   a pair of head inserting openings formed in the upper and lower halves,
   a shutter formed of synthetic resin and mounted on the main cartridge body and moveable in a sliding direction parallel to a front side of the main cartridge body and along outer sides of the main cartridge body, the shutter being constituted by upper and lower surface sections for covering and uncovering the head inserting openings when the shutter is slid between a first position and a second position, and a side plate section interconnecting the upper and lower surface sections, and
   a succession of alternating projections and recesses formed on portions of at least one of an outer surface of the main cartridge body or inner surfaces of the shutter, at a point where the shutter is in sliding contact with the main cartridge body, wherein the projections and recesses are aligned to extend parallel to the shutter sliding direction.

2. A disk cartridge as recited in claim 1, wherein the main cartridge body includes a shutter slide area and the projections and recesses are formed on the shutter slide area on the main cartridge body.

3. The disk cartridge according to claim 2 wherein the projections and recesses are formed by ribs extending parallel to the shutter sliding direction.

4. A disk cartridge according to claim 2, wherein the projections and recesses are formed on both the shutter inner surface and the shutter slide area of the main cartridge body.

5. A disk cartridge according to claim 1 and further comprising
   projections and recesses formed on at least one of the outer surface of said main cartridge body or the inner surface of said shutter, the outer surface and the inner surface being in sliding contact with each other, and
   a solid lubricant interposed between the outer surface and the inner surface.

6. A disk cartridge according to claim 1, wherein the projections and recesses are formed of a solid lubricant.

7. A disk cartridge rotatably accommodating a disk therein, comprising
   a main cartridge body consisting of an upper half and a lower half,
   a pair of head inserting openings formed in the upper and lower halves,
   a shutter formed of synthetic resin and mounted on the main cartridge body and moveable in a sliding direction parallel to a front side of the main cartridge body and along outer sides of the main cartridge body, the shutter being constituted by upper and lower surface sections for covering and uncovering the head inserting openings when the shutter is slid between a first position and a second position, and a side plate section interconnecting the upper and lower surface sections, and
   a solid lubricant interposed between an outer surface of the main cartridge body and an inner surface of the shutter, which outer surface and inner surface are in sliding contact with each other.

8. A disk cartridge rotatably accommodating a disk therein, comprising
   a main cartridge body formed of synthetic resin and consisting of an upper half and a lower half,
   a pair of head inserting openings formed in the upper and lower halves,
   a shutter formed of synthetic resin and mounted on the main cartridge body and moveable in a sliding direction parallel to a front side of the main cartridge body and along outer sides of the main cartridge body, the shutter being constituted by upper and lower surface sections for covering and uncovering the head inserting openings when the shutter is slid between a first position and a second position, and a side plate section interconnecting the upper and lower surface sections, and
   a succession of alternating bearing surface projections and recesses formed on portions of at least one of an outer surface of the main cartridge body or inner surfaces of the shutter, at a point where the shutter is in sliding contact with the main cartridge body, to reduce sliding friction between the shutter and the main cartridge body.

9. A disk cartridge according to claim 8, wherein the projections are formed of a solid lubricant.

10. A disk cartridge according to claim 8, wherein the projections are formed as aligned ribs extending in a direction parallel to the sliding direction of the shutter.

11. A disk cartridge according to claim 8, wherein the projections are aligned to extend in a direction parallel to the sliding direction of the shutter.

12. A disk cartridge according to claim 11, wherein the projections are formed of a solid lubricant.

13. A disk cartridge according to claim 12, wherein the projections are formed as aligned stripes extending in a direction parallel to the sliding direction of the shutter.

14. A disk cartridge according to claim 13, wherein the stripes are formed of a solid lubricant.

* * * * *